(12) United States Patent
Romeo

(10) Patent No.: US 7,709,040 B2
(45) Date of Patent: May 4, 2010

(54) TOMATO PRODUCTS AND PROCESS FOR THEIR PREPARATION

(75) Inventor: Aurelio Romeo, Rome (IT)

(73) Assignee: Zanichelli Ricerche S.R.L., Rome (IT)

( * ) Notice: Subject to any disclaimer, the term of this patent is extended or adjusted under 35 U.S.C. 154(b) by 677 days.

(21) Appl. No.: 10/588,374

(22) PCT Filed: Jan. 25, 2005

(86) PCT No.: PCT/EP2005/000686

§ 371 (c)(1),
(2), (4) Date: Aug. 2, 2006

(87) PCT Pub. No.: WO2005/074714

PCT Pub. Date: Aug. 18, 2005

(65) Prior Publication Data

US 2008/0206438 A1   Aug. 28, 2008

(30) Foreign Application Priority Data

Feb. 6, 2004 (IT) ............................ MI2004A0190

(51) Int. Cl.
*A23L 1/212* (2006.01)
(52) U.S. Cl. .................. 426/615; 426/478; 426/481; 426/489; 426/495; 426/650
(58) Field of Classification Search .................. 426/74, 426/620, 615, 640, 639, 658, 650, 478, 495
See application file for complete search history.

(56) References Cited

U.S. PATENT DOCUMENTS

| 4,186,089 A | * | 1/1980 | Okada ........................ 210/738 |
| 5,436,022 A | | 7/1995 | Chiang et al. |
| 2003/0224100 A1 | | 12/2003 | de la Cuadra et al. |

FOREIGN PATENT DOCUMENTS

| EP | 0888718 A1 * | 7/1999 |
| WO | WO-03/024243 A2 | 3/2003 |

OTHER PUBLICATIONS

Amazon.com:MIU Stainless-Steel tomato/Vegetable Mill (Apr. 3, 2009).*
http://www.crateandbarrel.com/Popup/Zoom.aspx?isPopup+true&f+24614&Frame=3 1997-2009 shop.com.*

* cited by examiner

*Primary Examiner*—Helen F Pratt
(74) *Attorney, Agent, or Firm*—Birch, Stewart Kolasch, & Birch LLP

(57) ABSTRACT

A process for treating tomato concentrates obtainable by concentration by evaporation, having a dry residue in percentage by weight higher than 15%, generally at least of about 18%, comprising the following steps: I) mixing of the tomato concentrate (component a)) with water (component b)); II) liquid separation by a separation solid-liquid apparatus, wherein the mass to be filtered is maintained under a slow stirring; III) addition of water and/or serum to the solid mass obtained in II).

22 Claims, No Drawings

TOMATO PRODUCTS AND PROCESS FOR THEIR PREPARATION

The present invention relates to tomato products having improved organoleptic properties with respect to the commercial tomato products, and optionally having an improved saucing power, in particular on pasta.

Tomato products, passatas and concentrates, marketed in Italy are classified as follows:

| | | |
|---|---|---|
| passatas | | dry residue $\leq$ 10% by weight, pref. 8-10%; |
| semiconcentrate | | dry residue 12% by weight; |
| concentrate | (C) | dry residue 18% by weight; |
| double concentrate | (DC) | dry residue 28% by weight; |
| triple concentrate | (TC) | dry residue 36% by weight. |

Industrial tomato concentrates are obtained by strong concentration processes. Generally the most used method is the concentration by evaporation.

Other concentration methods are not industrially used.

In fact, by using the reverse osmosis it is necessary to operate at temperatures of about 70° C. to have a satisfactory concentration yield. The apparatus membranes must be periodically cleaned and regenerated. Chemical detergents are generally used, which must then be carefully removed from the membranes. In fact, if present in traces, said compounds can pollute the tomato products. See C. S. Leoni "I derivati industriali del pomodoro", experimental Station for the food preserves industry in Parma, October 1993, pages 92-93. The cryoconcentration is inapplicable to the tomato juice due to the high percentage of solids in suspension, which would be separated together with ice. See page 93 of the previous quotation.

In practice the concentration by evaporation remains the industrial method of choice to concentrate the tomato juice. See page 93 of the previous reference. This method implies juice heating. With this process a tomato product is obtained with worsened organoleptic and nutritional properties. The organoleptic variations are a caramel taste and a typical cooking ("cotto") aroma present in the indicated tomato products and they are mainly due to the formation, during juice concentration, of hydrogen sulphide, dimethylsulphide, furfural, 3-methylmercaptopropanal, 2,4-heptadienal, acetaldehyde, phenylacetaldehyde, pyrrolidoncarboxilic acid. See S. Porretta "Il controllo della qualità dei derivati del pomodoro", experimental Station for the food preserves industry in Parma (1991), page 51; S. J. Kazeniac et al., J. Food Sci. 35 519 (1970); Shallenberge R. S. et al., J. Agric. Food Chem. 6, 604-605 (1958).

The nutritional variations are mainly due to the degradation of the carotenoids present in the tomato and in particular of lycopene. The tomato as such and its products have a high nutritional value deriving from the vitaminic components, and mainly from the contained carotenoids. The tomato product consumption is associated to a risk decrease of some cancer types (prostata, pancreas, stomach). See H. Gerster, J. Am. Coll. Nutr. 1997, 16, 109-126; S. K. Clinton Nutr. Rev. 1998 56, 35-51 for the lycopene presence in the tomato products. The previously described nutritional beneficial effects are to be ascribed to the carotenoids contained in the tomato and in particular to lycopene.

The tomato product colour should be that of the ripened tomatoes. However in tomato concentrates it is difficult to achieve this result. In the commercial tomato concentrates products altering the colour thereof are present: dark yellow pigments due to the Maillard reaction; alteration of the carotenoids contained therein, black specks (V. W. A. Hayes et al., Crit. Rev. Food Sci. Nutr. 1998, 38, 536-564, in particular page 546).

Also tomato passatas have worsened organoleptic and nutritional properties since they are obtained by mixing tomato juice with concentrated tomato products, obtained as above.

As regards the saucing power, most of the commercial tomato products, for example concentrated product, must be diluted before use. The saucing power of the triple concentrate (TC) as such, before dilution, is higher than that of the other commercial tomato products, including concentrates. By saucing power it is meant the product capability to stick to foods to which it is added, for example to pasta. However, as said, these concentrated products must be diluted before or during use because of their too strong and unpleasant taste. Consequently the advantage of the higher saucing power of these products is lost. Generally all the commercial tomato concentrates having a dry residue above 12% show such taste problem and therefore must be diluted.

If a semiconcentrate at 12% by weight of dry residue is used, which generally should not be diluted before use since it does not show unpleasant taste problems, the saucing power is very low.

The need was felt to have available a process for obtaining tomato products, substantially maintaining the same dry product content, the same ratio water soluble solids/water insoluble solids of the commercial products, but with an improved palatability and taste agreableness. Furthermore the need was felt to prepare tomato products having also a percentage of water insoluble solids higher than 18% by weight on the dry residue but with an improved palatability and taste agreableness with respect to the above commercial products and having an improved saucing power.

The Applicant has surprisingly and unexpectedly found a process to solve said technical problem.

An object of the present invention is a process for treating tomato concentrates obtainable by concentration, by evaporation having a dry residue in percentage by weight higher than 15%, generally at least of about 18%, comprising the following steps:

I) mixing of the tomato concentrate (component a)) with water (component b));

II) liquid separation by a separation solid-liquid apparatus, wherein the mass to be filtered is maintained under a slow stirring;

optionally

III) addition of water and/or serum and/or tomato juice and/or passata to the solid mass obtained in II).

The tomato concentrates, used as starting product, can optionally be used after separation of the liquid surnatant present after the storage of the commercial tomato concentrate.

Step III) has the purpose to reach the desired value of dry content (by addition of water), and/or vary the insoluble solid/soluble solid ratio (by adding serum, tomato juice and/or passata).

In step II) of the process an apparatus equipped with a mechanical stirrer for example centrally placed, is preferably used, said stirrer having angular speed from 1 rpm to 20 rpm, preferably from 2 rpm to 10 rpm, the stirrer blades being of a shape such that the suspension is conveyed to the central axis of the device.

Alternatively an equipment wherein the stirrer is absent can be used and it is the separation solid-liquid apparatus itself which rotates around the longitudinal central axis, the apparatus rotation speed being from 1 rpm to 20 rpm, preferably from 2 rpm to 10 rpm.

Another method to carry out stirring in step II) is to use an apparatus constituted by a sieve maintained under motion, for example an oscillating motion, preferably a nutational motion, the oscillations/minute generally being from 1 to 20 oscillations/minute, preferably from 2 to 10 oscillations/minute.

To carry out step II) of the process of the invention alternatively can be used a solid-liquid separation equipment of the prior art, such as a decanter (see WO03/024243). In this case the mass separated by centrifugation should have a dry residue content preferably from 18% to 25% by weight, more preferably 19%-21%. The Applicant has found that, when the dry residue is higher than 25%, the residue is difficult to be further formulated, or dispersed in water, and/or serum, and/or tomato juice, and/or passata used in step III).

In step I) as component b) at the place of water or together with water a tomato juice or a passata can be used.

The tomato passata has a dry content $\leq 10.0\%$ by weight, preferably 5-7%.

The dry residue according to the present invention is determined as specified in the characterization methods indicated in the Examples.

In step I) the weight amount of component b) which must be used depends on the dry concentration of the concentrate to be treated component a). Generally with concentrates having a dry content from 15% to 20% by weight, weight amounts of component b) are used from about ⅙ to 4 times, preferably from ¼ to 2 times, still more preferably from ¼ to 1 times with respect to the weight of component a). Instead of adding the amount of component b) all together, for example in a quantity 2 times by weight with respect to component a) and carrying out only one washing, it can be advantageous to effect 3-5 washings by using a lower amount of b) for each washing. In this way there are lower liquid volumes to be handled and the results are substantially better.

Preferably for concentrates having a dry content from 20% to 40% by weight, weight amounts of component b) are used equal to from ½ to 4 times, preferably from ½ to 2 times, more preferably from ½ to 1 time with respect to the weight of component a).

Generally the minimum amount of component b) in the mixture is such to obtain a product having a consistency of a wet powder to a dough-like paste which is filterable.

The invention process is preferably carried out under sterile conditions. Alternatively the product obtained at the end of step III) is sterilized. In this case sterilization can be carried out by conventional methods, preferably by tindalization, optionally under high pressure, for example in the range 5,000-7,000 atm.

The solid-liquid separation of step II) is carried out at temperatures generally lower than 40° C., preferably lower than 20° C. Generally intervals 5° C.-25° C., preferably 10° C.-15° C., are used. As pressure, the atmospheric pressure or slightly higher pressures, from 760 mm Hg (0.101 MPa) up to 900 mm Hg (0.12 MPa) can be used, or by applying pressures slightly lower than the atmospheric pressure, down to 450 mm Hg (0.06 MPa).

The liquid or serum which separates from the filtration process has a not very pleasant smell and taste, it appears cloudy and contains in suspension brown-red coloured particles. This serum is discarded.

Optionally steps I) and II) of the process according to the present invention can be repeated several times using every time a fresh aliquot of component b), for example water, to dilute the starting products. In this way the solid obtained after each single filtration results more and more free from the decomposition products contained in the starting tomato concentrate.

The process according to the present invention can optionally be carried out by operating under inert gas atmosphere, for example nitrogen. In this way it is avoided the contact between the product under processing and the oxygen in the presence of light, and therefore the degradation of some nutritional tomato components.

With the invention process, step I) of dilution of the concentrate component a) with component b), combined with step II) serum separation, it is obtained a tomato concentrate improved from the nutritional and taste point of view, since a large part of the products deriving from the thermal, degradation (smelly compounds) and by the mechanical degradation of the vegetable matrix (finely subdivided solids in suspension in the serum) are removed with the serum separated during the filtration (step II).

The apparatus which is preferably used to carry out step II) of the present invention process is a solid-liquid separator, for example of a food grade stainless steel reactor, having walls with openings or holes formed for instance with woven wire cloth or with wire screens or welding screens. Alternatively the walls have holes such as punched holes or drilled holes or slot milled holes or beam perforated holes, prepared by methods such as for example "laser perforation" or "electron beam perforation".

The width of the openings or slots, or the diameter in the case of holes, is not greater than 0.1 mm and preferably not lower than 0.02 mm. The slots length is not critical. For example said length can range from 30 cm to 2 meters, depending on the total volume of the mixture of the two components a)+b) to be treated. When the separation solid-liquid apparatus has a bottom wall, this is preferably made of a plate without slots or holes.

Preferably the solid-liquid separator has a cylindrical section.

The apparatus is furthermore equipped, as said, with a device for mechanical stirring. Stirring must be very slow, the angular speed generally being from 1 rpm to 20 rpm, preferably from 2 rpm to 10 rpm, the device being such that the solid is conveyed in the separator central zone (with reference to the longitudinal axis). It has been found that this type of stirring prevents the solid from adhering and accumulating on the walls, so as to avoid the formation of an occlusive layer on the separator walls during the processing.

The distance between the walls and the stirrer blades ranges from 0.5 to 2 cm.

The solid-liquid separation in the process of the present invention ends when in the separator there is a compact mass which does not separate any longer tomato serum.

Unexpectedly during this step there is no clogging of the separators having holes or openings of the above sizes, since unexpectedly a compact mass is formed, as said above. This result could be not foreseen, since one would expect the formation of a product layer adhering to the walls and substantially impermeable.

Said mass which is formed during the solid-liquid separation according to the process of the present invention is compact and does not adhere to the walls, whereby it is easily recoverable from the separator.

The invention process by using said apparatus has a very high productivity since there are no product clogging on the screens with consequent process downtime for the separator cleaning.

An alternative apparatus usable for the solid-liquid separation in step II) of the process according to the present invention, as said, is formed of a concave- or flat-shaped sieve, having holes diameter or slots opening not greater than 0.1 mm, preferably not lower than 0.02 mm, wherein the mixture to be filtered is loaded. The mass in the sieve is kept under an oscillatory motion, until a compact mass is formed, as said above, which does not separate any longer the serum. The compact mass is easily recovered since it does not adhere to the sieve. The temperature conditions are those indicated above when the separator with stirrer is used; preferably atmospheric pressure is used. The number of oscillations/minute at which one operates are those indicated above.

Another apparatus usable in step II) is a cylinder wherein the walls are, for example, of food grade stainless steel and have slots or holes of the same kind as those mentioned for the above described separator. The width of the openings or slots or the diameter in the case of holes, is not greater than 0.1 mm and preferably not lower than 0.02 mm. Said cylinder is fixed and has inside a stirrer in the form of an Archimedean screw, or the apparatus is rotating around the longitudinal central axis and has the shape of an helix wound about its own central axis. In this case there is no mechanical stirrer. The angular speed is generally from 2 to 10 rpm. The process is preferably carried out under temperature and pressure conditions above described for the process in which the separator is used. Preferably the cylinder is in an horizontal position, and has a diameter which can for example range from 30 cm to 1 meter, length from 2 meters to 20 meters. When the apparatus works in a discontinuous way, preferably the length ranges from 2 meters to 5 meters. When the apparatus works in a continuous way, preferably the length is about 20 meters. When one works in a discontinuous way, the mass to be filtered is let pass into the cylinder, with several recycling steps, until a compact mass is formed and there is no separation of serum any longer.

The separator can be of metal, steel included, or also of plastic material. Preferably the apparatus is made of food grade stainless steel. The usable plastic materials can be constituted by propylene homopolymers and copolymers, ethylene homopolymers and copolymers, etc.

In step III) the addition of water serves to adjust the dry residue amount; the addition of serum and/or tomato juice and/or passata serves to adjust the insoluble/soluble solid ratio. The serum is optionally concentrated or lyophilized.

The tomato products obtainable with the invention process at the end of step II) have a water insoluble solid amount higher than that of the starting product and a water soluble solid amount lower than that of the starting product.

As said, with the process of the invention, tomato products are obtainable having a decreased amount of degradation product with respect to the starting tomato products. In particular the amount of pyrrolidone carboxylic acid (pyroglutamic acid) is substantially decreased. The amount of the latter substance can be taken as an index of the degradation degree of tomato products. Generally the dry residue in the obtainable tomato products is higher than 12% by weight, preferably higher than 15% till 70%, more preferably from 18% to 36% by weight. The insoluble solid/soluble solid ratio is preferably that of the commercial concentrated products. In this way concentrated products are obtainable with less decomposition products with respect to the commercial products.

With the process of the invention, tomato products having insoluble solid content lower than 15%, preferably from 14.99% to 12%, can be prepared. Generally the dry residue ranges from 7% to 70%, preferably from 7% to 28%, still more preferably from 7% to 13%. This dry content is obtainable, as said, by adding water, and/or serum, and/or tomato juice (see step III) of the invention). From said tomato products having an insoluble content lower than 15% by weight, it is possible to prepare tomato compositions as described in more detail below. One can cite sauces, ketchups and other food products having a good consistency and higher saucing power. These food compositions can incorporate fats in higher amount with respect to the commercial products. This is due also to the increased presence of the insoluble solids. As said below, food compositions can also be obtained by using tomato products having an amount of insoluble solids higher than 15%.

A further object of the present invention is the obtainment with the process herein above described of tomato products wherein the ratio between water insoluble solids/soluble solids can be adjusted. By addition of fresh tomato serum as such, concentrated or lyophilized, the amount of water soluble solids is increased. By washing with water the obtained tomato product, the amount of water insoluble solids is increased. It is thus possible to obtain tomato products characterized by improved organoleptic properties and therefore improved palatability and taste agreableness with respect to the commercial products. The obtainable tomato products are (% by weight) the following:

| | |
|---|---|
| dry residue | 5.5-20%, |
| water | 94.5-80%; |

100% being the sum of the two components;

wherein the amount of insoluble solids and soluble solids in the dry residue ranges in percentage by weight as follows:

water insoluble solids ≧15%, pref. from 18% to 70%, water soluble solids ≦85%, preferably from 82% to 300%, the sum of the water insoluble solids+water soluble solids being 100%, the organoleptic properties being improved, and therefore better palatability and taste agreableness, with respect to the starting tomato concentrates obtainable by concentration by evaporation.

Preferably the water insoluble solids and the water soluble solids in the dry residue range in percentage by weight as it follows:

water insoluble solids: 18%-25%, preferably 18%-20%.

water soluble solids: 82%-75%, preferably 82%-80%.

The total dry residue, the water soluble solids and the water insoluble solids are determined as described in the Examples.

As said, from the tomato products obtainable with the invention process it is possible to obtain concentrated tomato products having the same water insoluble/soluble (or soluble/insoluble) solid ratio of the commercial tomato products but characterized by having improved organoleptic properties and therefore improved palatability and taste agreableness. These products are obtainable by addition of serum as such, or concentrated or lyophilized to obtain the ratio water insoluble solids/water soluble solids of the commercial products; or by dilution or concentration at low temperature according to the invention process to obtain the dry residue as that of the commercial products.

Generally in the commercial products the water insoluble solid amount is lower than 15% by weight in the dry residue. Therefore the concentrated tomato products are for instance the following (commercial tomato concentrates, for example in Italy) (% by weight):

| | | |
|---|---|---|
| concentrate | (C) | dry residue about 18%, |
| double concentrate | (DC) | dry residue about 28%, |
| triple concentrate | (TC) | dry residue about 36%, |

Generally in the tomato concentrates obtainable with the process of the invention the dry residue ranges from >12% by weight up to 70%, preferably from about 18% to about 60%, still more preferably from 18% to 36%.

From the tomato concentrates of the invention, by addition of fresh tomato juice it is possible to obtain commercial passatas and semiconcentrates but characterized in having improved organoleptic properties and therefore improved palatability and taste agreableness. Generally said commercial products, for example in Italy, are classified as follows (% by weight):

tomato passatas: the dry residue is lower than or equal to about 10% by weight, generally 5-7% by weight;
semiconcentrate: dry residue about 12%.

As said, the products obtainable with the present invention process contain lower amounts of products of thermal degradation of serum and of the tomato vegetable matrix and of mechanical degradation of the tomato vegetable matrix, the organoleptic properties being thus improved and therefore a better palatability and taste agreableness, with respect to the starting tomato concentrates obtainable by concentration by evaporation. As said, the organoleptic properties of the invention products are improved with respect to the commercial tomato concentrates.

It has been found by the Applicant that the invention products, when passata and/or the fresh tomato juice are used instead of water as component b) in step I) of the invention process, substantially have a typical aroma of the fresh tomato since volatile components which are contained in the tomato fruit are present and seem responsible of the aroma (Buttery R. G. et al., J. Agr. Food Chem. 19, 524 (1971)).

As said, the tomato products obtainable with the present invention process show also an improved saucing power. The test to determine the saucing power is described in the Examples.

The tomato products obtainable with the invention process can be mixed with other foodstuffs to obtain new edible product compositions. In fact the Applicant has found that the invention tomato products can unexpectedly incorporate, for example, by mechanical mixing, without serum separation, food products containing fats. The amount of the latter products can range within wide values. The preferred highest limit being the non miscibility of the products containing fats (i.e. it is not miscible with the tomato product anymore). Examples of fat containing products are: animal and vegetable fats, solid at room temperature, such as for example butter or margarine, mayonnaise, and/or fats liquid at room temperature as for example vegetable oils, for example olive oil, and/or cheese having soft-, or fresh-grain or hard-grain and grated. Any kind of mayonnaise can be used, for example also commercial mayonnaise "light" having a lower content of fats with respect to the mayonnaise.

Preferably the fat contained in the foodstuff is an amount higher than 10% by weight, more preferably higher than 20% by weight, on the weight of the foodstuff. Other examples of these fat containing foodstuffs are spreadable salami, spreadable ham, etc.

These edible compositions containing the tomato products of the invention are characterized by a lower energetic value as shown by the lower value of the Kcal/100 g. Further, the above edible foodstuffs are characterized by a pleasant taste due to the reduced amount of the decomposition products contained in the tomato products of the invention. The above decomposition products, as said, impair the organoleptic and nutritional properties of the tomato products. Further, the edible foods obtainable with the tomato products of the invention can be used as foods per se. These foods are characterized by a lower calories content. In addition these foods have a good content of licopene. This allows to get all the known beneficial effects tied to licopene (see above).

Preferably the starting tomato product used to prepare said compositions should have a water insoluble solid content and a water soluble solid content in the dry residue in percentage by weight as follows:

water insoluble solids: from 18% to 25%, pref. 18%-20%.
water soluble solids: from 82% to 75%, pref. 82%-80%.

Generally the amount of oil which can be incorporated in the tomato composition ranges from 10 to 25% by weight referred to the weight of the starting tomato product. Solid fats and soft-grain cheese can be incorporated in any desired amount, since said components are perfectly miscible in all weight ratios with the tomato product. The amounts of solid fats and of soft-grain cheese which can be incorporated range for example from 30% to 300% by weight, referred to the weight of the starting tomato product. When food fats that are solid at room temperature are used, it is preferable to previously heat said fats, before mixing with the invention tomato product, at least up to the softening point of said fats, preferably not above their melting point. The amount of hard-grain and grated cheeses which can be incorporated ranges from 10 to 25%.

Said compositions can be used as ready-to-use condiment since they incorporate, as said above, oil, butter and/or cheeses. To said compositions other usual ingredients of food products, such for example aromas, essences, preservatives, etc, can be added.

The mayonnaise amount which can be incorporated in the compositions or mixtures with the tomato products of the invention ranges preferably from 90% to 20% by weight referred to the starting tomato product weight.

The invention tomato compositions, in particular those obtainable by mixing the invention tomato products with fats and/or oils and/or cheeses and/or mayonnaise and/or spreadable salami and/or spreadable ham, can also be used as foods. For example these products can be spread on bread, as it is made for soft cheeses.

The Applicant has found that for preparing the invention tomato compositions incorporating fat containing food products, optionally pectins and/or polysaccharides can be added. The addition of these compounds is preferred when the invention tomato products have a water insoluble solid content lower than 25% by weight (on the dry residue), still more preferably lower than 18%. The amount of these compounds which can be added ranges generally from 10% to 20% by weight on the tomato composition.

Examples of polysaccharides are carboxymethylcellulose, methylcellulose, alginates, agar rubber, carragenanes, gum-arabic, karaya rubber, tragacanth rubber.

The above pectins and polysaccharides can also be added to the concentrated tomato products as such obtainable with the process of the present invention. In this way the saucing power of the tomato concentrates is further increased. Furthermore the lycopene content is diluted.

The process of the present invention allows to have available an industrial plant which can work at any time. This is an advantage over the processes of the prior art which use the tomato fruits which, as known, are produced only in certain period of the year.

The following Examples are given for illustrative and not limitative purposes of the present invention.

EXAMPLES

Characterization Methods

Determination of the Saucing Power of a Tomato Product According to the Invention Materials:
tomato product to be tested,
vegetable oil, preferably olive oil,
full length, not broken spaghetti No. 12 De Cecco trade mark with cooking time indicated by the manufacturer 12 minutes,
sea salt.

90 g of tomato product to be tested and 10 g of vegetable oil (condiment total weight: 100 g) are introduced into a vessel, preferably a plastic vessel, previously weighed and having 1 liter capacity.

70 g of spaghetti are cooked apart, in 1 liter of water containing 5 g of sea salt, for the time indicated on the package. At the end the cooked spaghetti are strained until no drops form any longer.

The cooked spaghetti are added to the condiment previously prepared in the plastic vessel and by a fork they are carefully mixed, slowly for 5 minutes. The vessel is then put on a boiling water bain-marie for 5 minutes, without mixing. From the vessel with a fork the spaghetti are taken in a number of 2-3 at a time and without shaking them, it is let fall in the vessel the condiment which tends to immediately detach.

In the plastic vessel it remains the condiment which has not adhered to the spaghetti. Lastly the plastic vessel is weighed and in this way it is determined the condiment weight which has not adhered to the pasta. The difference to 100 (initial condiment weight) gives the amount which has remained attached to the pasta ($Q_A$).

The saucing power is defined on the basis of the following equation:

$$\text{Saucing power} = \frac{Q_A \times 10}{100}$$

Determination of the Dry Residue: Total Solids

The total dry residue is determined in the tomato juice using a vacuum stove (vacuum degree not higher than 450 mm Hg—59.85 KPa) at 70° C. The method is as described in Journal Officiel des Communitées Européenes 7.6.86 L.153 pages 5-6.

Determination of the Water Content

The water content is determined by the weight difference between the total weight and the dry residue.

Determination of Water Soluble Solids

The determination of water soluble solids has been carried out using an Abbe refractometer (Brix degrees or Brix value), as described in Journal Officiel des Communitées Europ-éenes 7.6.86 L.153 pages 6-9. The Brix value represents the percentage by weight of the water soluble solids on the total mass of the tomato products.

Determination of Water Insoluble Solids

The determination of water insoluble solids has been carried out by calculating the weight difference between the dry residue and that of the water soluble solids (Brix value), as reported in "Tomato Production, Processing and Technology, 3rd Ed." by W. A. Gould, CTI Publications, Inc., 1992 page 317.

Determination of Pyrrolidone Carboxylic Acid

A liquid chromatograph instrument was used, equipped with a column Aminex HPX-87H 33 mm×7.8 mm (Bio-Rad, Catalog #125-0140). The injected volume was of 20 µl, the mobile phase 0.008 M sulphuric acid. Flow rate was 0.60 ml/min, detection UV 210 nm.

Before analysis the sample is diluted and filtered on a filter having 0.45 µm pores. The peak is identified and quantitated by running in the same column a sample of a known quantity of the pure acid.

Determination of Lycopene

The determination of lycopene has been carried out by extraction from the tomato products and HPLC analysis as described in J. Agric. Food Chem. (2001) 49 3713-17 by G. R. Takeoka et Al.

Example 1

754 g of tomato concentrate Cirio® (dry residue 23%) are put in a 3 liter reactor equipped with stirrer. 754 g of tomato passata Santa Rosa® are added. The mixture is maintained between 5° C. and 10° C. and under stirring at the speed of 10 rpm, until the mixture results homogeneous.

The mass is transferred into a 3 liter solid-liquid separator equipped with stirrer. The separator has the walls constituted by interwoven wire gauze having a hole diameter of 0.04 mm. The separator shape is such that the solid is conveyed towards the separator central zone. The distance between the separator walls and the stirrer blades is 0.5 cm. The stirring (4 rpm) is started and it is operated at a temperature in the range 5° C.-10° C.

The serum which separates is cloudy and contains in suspension red-brownish coloured particles. After 5 hours of stirring it is noticed that no serum is any longer separated.

The filtered serum has 12.2 Brix degrees (12.2% of soluble solids).

The doughy mass remained inside the separator weighs 668 g and appears very compact. The dry residue is 19.1% by weight with a content of water insoluble solids higher than 30%.

The dry residue coming from the starting concentrate appears red-brown coloured and it does not detach from the vessel used for such determination.

The dry residue coming from the mass recovered at the end of the process (668 g) has a red colour of a ripenend tomato and detaches spontaneously from the vessel used for the determination.

Example 2

754 g of tomato double concentrate Mutti® (dry residue 31.2%) are put in a 3 liter reactor equipped with stirrer. 754 g of tomato passata Santa Rosa® are added. The mixture is maintained between 5° C. and 10° C. and under stirring at the speed of 1.0 rpm, until the mixture results homogeneous.

The mass is transferred into a 3 liter solid-liquid separator equipped with stirrer. The separator is the same used in the Example 1. The stirring (4 rpm) is started and it is operated at a temperature in the range 5° C.-10° C.

The serum which separates is cloudy and contains in suspension red-brownish coloured particles. After 5 hours of stirring it is noticed that no serum is any longer separated.

The filtered serum has 15.2 Brix degrees (12.2% of soluble solids).

The doughy mass remained inside the separator weighs 625 g and appears very compact. The dry residue is 23.3% by weight with a content of water insoluble solids higher than 30%.

The dry residue coming from the starting concentrate appears red-brown coloured and it does not detach from the vessel used for such determination.

The dry residue coming from the mass recovered at the end of the process (625 g) has a red colour of a ripened tomato and detaches spontaneously from the vessel used for the determination.

Example 3

1320 g of tomato double concentrate Mutti® are put in a 5 liter reactor equipped with stirrer.

Said tomato product has a residual pyrrolidone-carboxylic acid content of 9.13 g/Kg, as determined by the analytical assay herein above described.

By operating at room temperature (25° C.), to said quantity of tomato double concentrate 1320 g of sterile water are added under stirring (10 rpm), until the mixture results homogeneous.

The mixture is then transferred into a 5 liter solid-liquid separator equipped with stirrer. The separator has the walls constituted by interwoven wire gauze having a hole diameter of 0.037 mm. Stirring (2 rpm) is started and it is operated in a sterile environment at a temperature in the range 5° C.-10° C. After 10 hours, stirring was interrupted and the formed compact mass recovered from the separator. Said mass weighed 660 g and had the following analytical features:

| | |
|---|---|
| Dry residue: | 19.4% |
| Soluble solids (Brix) | 15.0% |
| Insoluble solids | 4.4% |
| Insoluble solids in the dry residue | 22.7% |
| Pyrrolidone carboxylic acid | 4.58 g/Kg |
| Lycopene | 452 mg/Kg |

Therefore by using the process of the present invention the quantity of residual pyrrolidone carboxylic acid is nearly halved in the confront of that contained in the starting double concentrate. That means that the product obtained has been substantially purified.

Example 4

In a 3 liter reactor equipped with stirrer 660 g of tomato passata Santa Rosa® (Brix degrees 5.8) are loaded. The mixture is maintained between 5° C. and 10° C. and under stirring (10 rpm) a quantity of the product isolated in Ex. 3 is added until the mixture shows a Brix degree of 8.30.

The obtained mixture showed the following analytical features:

| | |
|---|---|
| Dry residue: | 9.81% |
| Soluble solids (Brix) | 8.30% |
| Insoluble solids | 1.51% |
| Insoluble solids in the dry residue | 15.39% |

Example 5

In a 3 liter reactor equipped with stirrer 760 g of tomato passata Santa Rosa® (Brix degrees 5.8) are loaded. The mixture is maintained between 5° C. and 10° C. and under stirring (10 rpm) a quantity of the product isolated in Ex. 3 is added until the mixture shows a Brix degree of 7.02.

The obtained mixture showed the following analytical features:

| | |
|---|---|
| Dry residue: | 8.42% |
| Soluble solids (Brix) | 7.02% |
| Insoluble solids | 1.40% |
| Insoluble solids in the dry residue | 16.63% |

Example 6

In a 3 liter reactor equipped with stirrer 660 g of tomato passata Santa Rosa® (Brix degrees 5.8) are loaded. The mixture is maintained between 5° C. and 10° C. and under stirring (10 rpm) a quantity of the product isolated in Ex. 3 is added until the mixture shows a Brix degree of 9.50.

The obtained mixture showed the following analytical features:

| | |
|---|---|
| Dry residue: | 10.87% |
| Soluble solids (Brix) | 9.50% |
| Insoluble solids | 1.37% |
| Insoluble solids in the dry residue | 12.60% |

Example 7

In a 3 liter reactor equipped with stirrer 760 g of tomato passata Santa Rosa® (Brix degrees 5.8) are loaded. The mixture is maintained between 5° C. and 10° C. and under stirring (10 rpm) a quantity of the product isolated in Ex. 3 is added until the mixture shows a Brix degree of 8.04.

The obtained mixture showed the following analytical features:

| | |
|---|---|
| Dry residue: | 9.45% |
| Soluble solids (Brix) | 8.04% |
| Insoluble solids | 1.41% |
| Insoluble solids in the dry residue | 14.92% |

Example 8

In a 3 liter reactor equipped with stirrer 1680 g of tomato passata Santa Rosa® (Brix degrees 5.8) are loaded. The mixture is maintained between 5° C. and 10° C. and under stirring (10 rpm) a quantity of the product isolated in Ex. 3 is added until the mixture shows a Brix degree of 10.64.

The obtained mixture showed the following analytical features:

| | |
|---|---|
| Dry residue: | 12.20% |
| Soluble solids (Brix) | 10.64% |

| -continued | |
|---|---|
| Insoluble solids | 1.56% |
| Insoluble solids in the dry residue | 12.79% |

Example 9

Edible Composition Made of Butter and of a Tomato Product According to the Present Invention

In a pan 30 g of butter are heated up to the softening point and then 70 g of the tomato product isolated in Ex. 3 are added and admixed under stirring with the softened butter. Kitchen salt q.s. is further added. Stirring is continued until obtaining an homogeneous aspect of the mixture.

The edible composition thus obtained does not separate serum even after 20 days of storage in a refrigerator at 5° C.

Example 10

Edible Composition Made of Margarine and of a Tomato Product According to the Present Invention

In a pan 50 g of softened margarine are admixed under stirring with 70 g of the tomato product isolated in Ex. 3. Kitchen salt q.s. is further added. Stirring is continued until obtaining an homogeneous aspect of the mixture.

The edible composition thus obtained does not separate serum even after 20 days of storage in a refrigerator at 5° C.

Example 11

Edible Composition Made of Mayonnaise and of a Tomato Product According to the Present Invention

In a bucket 50 g of mayonnaise Kraft® (315 Kcal) are admixed under stirring with 50 g of the tomato product (27 Kcal) isolated in Ex. 3. kitchen salt q.s and lemon juice q.s. are further added. Stirring is continued until obtaining an homogeneous aspect of the mixture.

The edible composition thus obtained does not separate serum even after 20 days of storage in a refrigerator at 5° C. Said edible composition has a caloric content of 342 Kcal/100 g and a lycopene content of 22.6 mg/100 g; the taste is very good and egg taste is not perceived.

Example 12

Edible Composition Made of Mayonnaise "Light" and of a Tomato Product According to the Present Invention

In a bucket 50 g of mayonnaise Legeresse® Kraft® (187 Kcal) are admixed under stirring with 50 g of the tomato product (27 Kcal) isolated in Ex. 3. kitchen salt q.s. and lemon juice q.s. are further added. Stirring is continued until obtaining an homogeneous aspect of the mixture.

The edible composition thus obtained does not separate serum even after 20 days of storage in a refrigerator at 5° C. Said edible composition has a caloric content of 214 Kcal/100 g and a lycopene content of 22.6 mg/100 g. The taste is very good.

Example 13

Edible Composition Made of Parmesan Cheese and of a Tomato Product According to the Present Invention

In a bucket 5 g of Parmesan cheese (18.7 Kcal) are admixed, under stirring, with 45 g of the tomato product (27 Kcal) isolated in Ex. 3. 50 g of cheese Vitasnella® (Danone®, 44.5 Kcal) are further added. Stirring is continued until obtaining an homogeneous aspect of the mixture.

The edible composition thus obtained does not separate serum even after 20 days of storage in a refrigerator at 5° C.

Said composition has a caloric content of 87.3 Kcal/100 g, taste is very good.

Example 14

Edible Composition Comprising Salami, Mayonnaise and a Tomato Product According to the Present Invention

In a bucket 15 g of soft spicy salami (71.25 Kcal) are admixed, under stirring, with 50 g of mayonnaise Legeresse® Kraft® (187 Kcal) and with 50 g of the tomato product (27.1 Kcal) isolated in Ex. 3. Stirring is continued until obtaining an homogeneous aspect of the mixture.

The edible composition thus obtained does not separate serum even after 20 days of storage in a refrigerator at 5° C.

Said composition has a caloric content of 248 Kcal/100 g.

The invention claimed is:

1. A process for treating tomato concentrates obtainable by concentration by evaporation, having a dry residue in percentage by weight higher than 15%, comprising the following steps:
   I) mixing of the tomato concentrate (component a)) with water (component b));
   II) liquid separation by a separation solid-liquid apparatus, wherein the mass to be filtered is maintained under a slow stirring; and optionally
   III) addition of water and/or serum and/or tomato juice and/or passata to the solid mass obtained in II).

2. A process, according to claim 1, wherein in step II) an apparatus equipped with a mechanical stirrer preferably centrally placed, is used, having angular speed from 1 rpm to 20 rpm, the stirrer blades being of a shape such that the suspension is conveyed to the central axis of the device.

3. A process according to claim 1, wherein the separation solid-liquid apparatus rotates around the longitudinal axis with the rotation speed from 1 rpm to 20 rpm.

4. A process according to claim 1, wherein an apparatus is used constituted by a sieve maintained under an oscillatory motion, the oscillations-/minute being from 1 to 20 oscillations/minute.

5. A process according to claim 1, wherein in step I) as component b) in alternative and/or in association with water a tomato juice or a passata can be used.

6. A process according to claim 1, wherein, when in step I) concentrates having a dry content from 15% to 20% by weight are used, the weight amount of component b) is from about ⅙ to 4 times, with respect to the weight of component a).

7. A process according to claim 1, wherein when in step I) concentrates having a dry content from 20% to 40% by weight are used, the weight amount of component b) ranges from ½ to 4 times, with respect to the weight of component a).

8. A process according to claim 1, wherein one preferably operates under sterile conditions, or alternatively the product recovered at the end of step III) is sterilized.

9. A process according to claim 1, wherein the solid-liquid separation of step II) is carried out at temperatures lower than 40° C., by operating under atmospheric pressure or under slightly higher pressures, from 760 mm Hg (0.101 MPa) up to 900 mm Hg (0.12 MPa), or by applying pressures slightly lower than the atmospheric pressure, down to 450 mm Hg (0.06 MPa).

10. A process according to claim 1 wherein steps I) and II) are repeated several times using every time a fresh aliquot of component b).

11. A process according to claim 1, wherein in step II) a solid liquid separator is used having walls with openings or holes formed for instance with woven wire cloth or with wire screens or welding screens; alternatively the walls have holes such as punched holes or drilled holes or slot milled holes or beam perforated holes.

12. A process according to claim 11, wherein the width of the openings or slots, or the diameter in the case of holes, is not lower than 0.02 mm and the slots length ranges from 30 cm to 2 meters.

13. A process according to claim 11, wherein the width of the openings or slots, or the diameter in the case of holes, is not greater than 0.1 mm and not lower than 0.02 mm and the slots length ranges from 30 cm to 2 meters.

14. A process according to claim 1, wherein the apparatus used in step II) is a cylinder, preferably in an horizontal position, which has inside a stirrer in the form of an Archimedean screw, or the apparatus is rotating around the longitudinal axis and has the shape of an helix wound about its own axis, the angular speed being from 2 to 10 rpm.

15. A process according to claim 14, wherein the cylinder has a diameter ranging from 30 cm to 1 meter and length from 2 meters to 20 meters.

16. A process according to claim 1, wherein the separator is of metal or of plastic material.

17. A process according to claim 1 for treating tomato concentrates obtainable by concentration by evaporation, having a dry residue in percentage by weight higher than 18%, comprising the following steps:
  I) mixing of the tomato concentrate (component a)) with water (component b));
  II) liquid separation by a separation solid-liquid apparatus, wherein the mass to be filtered is maintained under a slow stirring; and optionally;
  III) addition of water and/or serum and/or tomato juice and/or passata to the solid mass obtained in II).

18. A process, according to claim 1, wherein in step II) an apparatus equipped with a mechanical stirrer preferably centrally placed, is used, having an angular speed from 2 rpm to 10 rpm, the stirrer blades being of a shape such that the suspension is conveyed to the central axis of the device.

19. A process according to claim 1, wherein the separation solid-liquid apparatus rotates around the longitudinal axis with the rotation speed from 2 rpm to 10 rpm.

20. A process according to claim 1, wherein, when in step I) concentrates having a dry content from 15% to 20% by weight are used, the weight amount of component b) is from about ¼ to 2 times, with respect to the weight of component a).

21. A process according to claim 1, wherein when in step I) concentrates having a dry content from 20% to 40% by weight are used, the weight amount of component b) ranges from ½ to 2 times, with respect to the weight of component a).

22. A process according to claim 1, wherein the solid-liquid separation of step II) is carried out at temperatures lower than 20° C., by operating under atmospheric pressure or under slightly higher pressures, from 760 mm Hg (0.101 MPa) up to 900 mm Hg (0.12 MPa), or by applying pressures slightly lower than the atmospheric pressure, down to 450 mm Hg (0.06 MPa).

* * * * *